A. R. & F. S. WELCH.
METHOD OF FINISHING CASTINGS.
APPLICATION FILED DEC. 30, 1910.
1,058,210.
Patented Apr. 8, 1913.
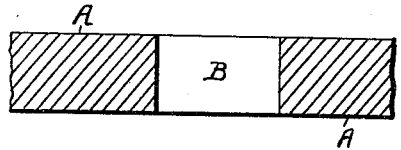
Fig. 1.
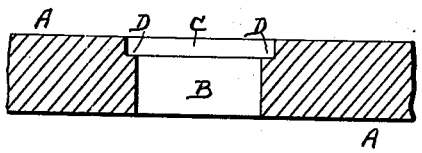
Fig. 4.
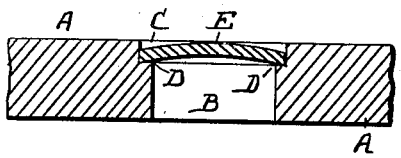
Fig. 5.
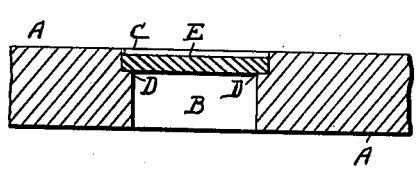
Fig. 6.
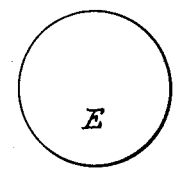
Fig. 2.
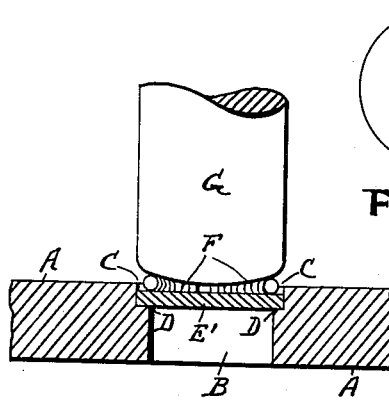
Fig. 7.
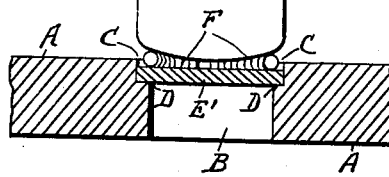
Fig. 8.
Fig. 3.
Witnesses
O. B. Baenziger.
Stuart E. Barnes.
Inventors
Allie Ray Welch
Fred Stinson Welch
Parker & Burton
Attorneys

UNITED STATES PATENT OFFICE.

ALLIE RAY WELCH AND FRED STIMSON WELCH, OF PONTIAC, MICHIGAN.

METHOD OF FINISHING CASTINGS.

1,058,210.  Specification of Letters Patent.  Patented Apr. 8, 1913.

Application filed December 30, 1910. Serial No. 600,139

*To all whom it may concern:*

Be it known that we, ALLIE R. WELCH and FRED STIMSON WELCH, citizens of the United States, residing at Pontiac, county of Oakland, State of Michigan, have invented a certain new and useful Improvement in Methods for Finishing Castings, and declare the following to be a full, clear, and exact description of the same, such as will enable others skilled in the art to which it pertains to make and use the same, reference being had to the accompanying drawings, which form a part of this specification.

Our invention relates to a method of finishing castings.

In many forms of castings where cores are used a support for the core leaves a hole in the casting, which it is desirable to close. By the invention hereinafter described, we provide a cheap, rapid and effective way for closing such holes.

In the drawings,—Figure 1, represents a portion of a casting with a hole left by a support for the core shown therein. Figs. 2, and 3, are respectively a plan view and a cross-section of the disk used in our process. Figs. 4, 5, and 6, represent steps in our process of closing such holes. Figs. 7, and 8, represent a modified way of performing our process.

A, A represents a portion of the casting. B indicates the hole left in said casting. We first bore out the outer end of the hole B to a larger diameter, as represented at C, leaving an annular shoulder or shelf D. We then provide a disk E, which we prefer to make of brass, having a circular shape and of the diameter of the enlarged portion C of the hole B. This disk is concaved, as indicated in Fig. 3. We place this disk upon the shoulder D, as represented in Fig. 5, and then by a blow of a hammer, or otherwise, flatten the disk down, as represented in Fig. 6, thus expanding the same in diameter and binding it firmly against the wall of the enlargement C of the hole B; thus effectively closing the hole. In a modified form, we place a flat disk $E^1$, which we also make of brass or other soft metal, upon the shoulder D. We then place a series of steel balls, such as are used for ball-bearings, within the enlargement C of the hole B, and around the edge of the disk $E^1$, as shown in Fig. 7. We then force down, upon these balls, a spindle G, of a drill press for instance, the spindle G having a convex end, as indicated in Fig. 7. The spindle G is then rotated, spinning and expanding the metal and grooving the same, as indicated at e, Fig. 8, thus expanding the disk $E^1$, and binding it firmly in place against the wall of the enlargement C of the hole B, and closing the hole.

Claims:—

1. The process of closing holes in castings, consisting in shaping the hole so as to permit a piece of suitable material to enter the outer end thereof and to prevent said piece from passing through the hole, and then expanding the piece to bind it in the hole.

2. The process of closing a hole in a casting, consisting in enlarging the outer end of said hole so as to form a shoulder, placing a piece of suitable material on said shoulder and expanding said piece by pressing the same against said shoulder.

3. The process of closing a hole in a casting, consisting in enlarging the outer end of said hole so as to form a shoulder, placing a concave disk on said shoulder and flattening said disk to force it against the walls of said opening and bind it in place.

4. The process of closing a hole in a casting, consisting in enlarging the outer end of said hole so as to form a shoulder, placing a workable metal disk on said shoulder, placing a hard metal ball on said disk near its periphery, and pressing said ball downward against said disk and rolling the same around said disk, substantially as and for the purpose described.

In testimony whereof, we sign this specification in the presence of two witnesses.

ALLIE RAY WELCH.
FRED STIMSON WELCH.

Witnesses:
FLORENCE L. MILWARD,
MARGUERITE GIDDINGS.